United States Patent [19]

Tanaka et al.

[11] Patent Number: 4,578,087
[45] Date of Patent: Mar. 25, 1986

[54] NITRIDE BASED CUTTING TOOL AND METHOD FOR PRODUCING THE SAME

[75] Inventors: Hiroshi Tanaka; Hidetoshi Baba, both of Aichi, Japan

[73] Assignee: NGK Spark Plug Co., Ltd., Aichi, Japan

[21] Appl. No.: 569,683

[22] Filed: Jan. 10, 1984

[30] Foreign Application Priority Data

Jan. 10, 1983 [JP] Japan ................................. 58-1988
Jun. 3, 1983 [JP] Japan ................................. 58-99901
Jun. 3, 1983 [JP] Japan ................................. 58-99902

[51] Int. Cl.⁴ ........................................... B24D 3/02
[52] U.S. Cl. ..................................... 51/295; 51/308; 51/309; 407/119; 501/97; 428/698
[58] Field of Search .................... 501/97, 126, 128; 407/119; 51/309, 307, 308, 295; 428/698, 699, 701, 908.8

[56] References Cited

U.S. PATENT DOCUMENTS

| | | | |
|---|---|---|---|
| 3,955,038 | 5/1976 | Lindstrom et al. | 407/119 X |
| 4,216,021 | 8/1980 | Hattori et al. | 501/97 |
| 4,421,525 | 12/1983 | Sarin et al. | 51/295 |
| 4,440,707 | 4/1984 | Shimamori et al. | 501/97 X |
| 4,442,169 | 4/1984 | Graham | 428/698 X |
| 4,449,989 | 5/1984 | Sarin et al. | 51/309 X |

FOREIGN PATENT DOCUMENTS

| | | | |
|---|---|---|---|
| 80711 | 6/1983 | European Pat. Off. | 501/97 |
| 52-31910 | 3/1977 | Japan | 407/119 |
| 55-85481 | 6/1980 | Japan . | |
| 55-116671 | 9/1980 | Japan | 501/97 |
| 57-205376 | 12/1982 | Japan | 501/97 |
| 58-95644 | 6/1983 | Japan | 501/97 |
| 58-95662 | 6/1983 | Japan | 501/97 |

*Primary Examiner*—William R. Dixon, Jr.
*Assistant Examiner*—Steven Capella
*Attorney, Agent, or Firm*—Sughrue, Mion, Zinn, Macpeak and Seas

[57] ABSTRACT

A nitride based ceramic cutting tool is described comprising from 50 to 90% by weight $Si_2N_4$, from 5 to 45% by weight TiN, and from 5 to 45% by weight sintering aid, said sintering aid comprising (1) at least one of $Y_2O_3$ and $Dy_2O_3$ and (2) $Al_2O_3$ alone or a mixture of AlN and $Al_2O_3$, said mixture comprising from 5 to 65% by weight AlN, and the weight ratio of (1) at least one of $Y_2O_3$ and $Dy_2O_3$ to (2) $Al_2O_3$ alone or the AlN and $Al_2O_3$ mixture being 3:1 to 1:3.

4 Claims, 2 Drawing Figures

NITRIDE BASED CUTTING TOOL AND METHOD FOR PRODUCING THE SAME

FIELD OF THE INVENTION

The present invention relates to a nitride based ceramic material for use as a cutting tool which shows superior wear resistance, thermal shock resistance and mechanical shock resistance, and is suitable for mass-production of such tool.

BACKGROUND OF THE INVENTION

Heretofore, an $Al_2O_3$-TiC-based material having superior wear resistance has generally been used as high-speed cutting ceramic tools. These tools, however, are not suitable for use in high-speed intermittent cutting such as milling, in which the tip is always subjected to thermal shock and mechanical shock, because of their insufficient thermal and mechanical shock resistances.

In recent years, $Si_3N_4$ which is superior in toughness, mechanical strength and hardness and which has thermal shock resistance due to the fact that the thermal expansion coefficient thereof is as small as $3.5 \times 10^{-6}/°C.$, has received increasing attention as a ceramic material suitable for high-speed intermittent cutting. However, in commercially producing ceramic tools using $Si_3N_4$, the following problems are encountered.

(1) Wear resistance is poor.
(2) Crater wear is large in the case of steel cutting.
(3) A hot press method is needed, since $Si_3N_4$ is difficult to sinter, leading to undesirably high production costs.

Thus various investigations have been made to overcome the foregoing problems. Japanese Patent Application (OPI) No. 32377/81 (the term "OPI" as used herein refers to a "published unexamined Japanese patent application"), for example, discloses a cutting tool material comprising 5 to 40% by weight at least one member of TiC, TiN and TiCN, 10% by weight or less at least one member of AlN, oxides of rare earth elements, and six other materials (i.e., $Al_2O_3$, MgO, $SiO_2$, Fe, Co and Ni), the remainder being $Si_3N_4$. Japanese Patent Application (OPI) No. 85481/80 discloses a throw-away tip comprising a sintered body mainly of $Si_3N_4$ which is hot-pressed, and a coating layer of at least one of $Al_2O_3$ and AlON provided on the surface of the sintered body. The former cutting tool, however, is not improved in wear resistance to the extent desired although the crater wear is reduced. In the latter cutting tool, the coating layer has an undesirable tendency to peel because of a large difference in the coefficients of thermal expansion between the $Si_3N_4$ and the coating material. Moreover, both the former and latter ceramic tools require a hot press method for the production thereof, increasing their production costs. These materials, therefore, are of low practical value for use in the mass-production of cutting tools.

SUMMARY OF THE INVENTION

As a result of extensive investigations, it has now been found that if a composite oxide as described hereinafter is added as a sintering aid to main components $Si_3N_4$ and TiN as described hereinafter, there can be obtained a sintered body which possesses the wear resistance and high toughness of TiN while retaining the superior characteristics of $Si_3N_4$ as described above, and which can be produced by a cold press method permitting mass-production.

Accordingly, an object of the present invention is to provide a nitride based ceramic material for use as a cutting tool, which exhibits a high wear resistance, high toughness, high crater wear resistance and high productivity.

The above object can be achieved, according to the present invention, by a nitride based ceramic material comprising from 50 to 90% by weight $Si_3N_4$, from 5 to 45% by weight TiN, and from 5 to 45% by weight a composite oxide sintering aid, said sintering aid comprising (1) at least one of $Y_2O_3$ and $Dy_2O_3$ and (2) $Al_2O_3$ alone or a mixture of AlN and $Al_2O_3$, said mixture comprising from 5 to 65% by weight AlN and the weight ratio of (1) at least one of $Y_2O_3$ and $Dy_2O_3$ to (2) $Al_2O_3$ alone or the AlN and $Al_2O_3$ mixture being 3:1 to 1:3.

DETAILED DESCRIPTION OF THE INVENTION

The nitride based ceramic material can be used effectually to form a cutting tool.

Figure 1:
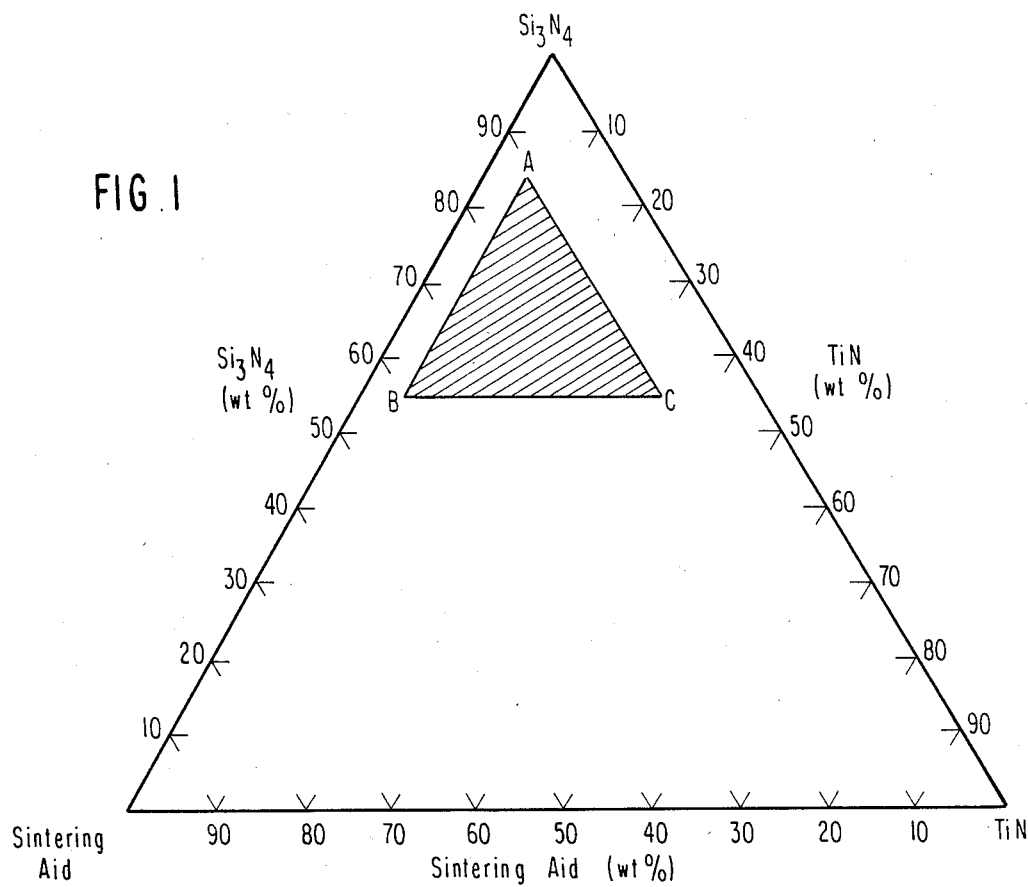
FIG. 1 is a triangular diagram showing the ratios of $Si_3N_4$ to TiN to the sintering aid that can be used in the production of the ceramic tool of the invention.

The present invention also relates to a nitride based ceramic cutting tool comprising $Si_3N_4$, TiN, and a sintering aid comprising (1) at least one of $Y_2O_3$ and $Dy_2O_3$ and (2) a mixture of AlN and $Al_2O_3$, said mixture comprising from 5 to 65% by weight AlN, and the weight ratio of (1) at least one of $Y_2O_3$ and $Dy_2O_3$ to (2) the AlN and $Al_2O_3$ mixture being from 3:1 to 1:3, in amounts such that the amount of $Si_3N_4$, TiN, and sintering aid falls within the range defined by lines connecting point A(84% by weight $Si_3N_4$, 5% by weight TiN, 11% by weight the sintering aid), point B (55% by weight $Si_3N_4$, 5% by weight TiN, 40% by weight the sintering aid), and point C (55% by weight $Si_3N_4$, 34% by weight TiN, 11% by weight the sintering aid) in the triangular diagram of FIG. 1.

The cutting tool may be coated with a suitable material as described below. In that case, the cutting tool is herein referred to as substrate.

An embodiment according to the present invention includes a cutting tool comprises a substrate containing from 50 to 85% by weight $Si_3N_4$, from 10 to 45% by weight TiN, from 5 to 40% by weight of a composite oxide sintered aid comprising (1) at least one of $Y_2O_3$ and $Dy_2O_3$ and (2) $Al_2O_3$, wherein the weight ratio of (1) at least one of $Y_2O_3$ and $Dy_2O_3$ to (2) $Al_2O_3$ is from 3:1 to 1:3, and a coating layer of $Al_2O_3$ provided on the surface of the substrate.

Another embodiment according to this invention includes a cutting tool which comprises a substrate comprising from 50 to 80% by weight $Si_3N_4$, from 10 to 40% by weight TiN, and from 10 to 40% by weight a composite oxide sintering aid comprising (1) at least one of $Y_2O_3$ and $Dy_2O_3$ and (2) $Al_2O$, wherein the weight ratio of (1) at least one of $Y_2O_3$ and $Dy_2O_3$ to (2) $Al_2O_3$ is from 3:1 to 1:3, an inner coating layer of at least one of AlN and AlON, or of at least one of TiC and TiN on the substrate, and an outer coating layer of Al₂O₃ on the foregoing coating layer.

In a related preferred embodiment, an inner surface coating layer of at least one of AlN and AlON or at least one of TiC and TiN is provided between the substrate and the outer surface coating layer of Al₂O₃.

A further embodiment according to this invention includes a cutting tool which comprises a substrate comprising from 50 to 85% by weight Si₃N₄, from 10 to 45% by weight TiN, and from 5 to 40% by weight a composite oxide sintered aid comprising (1) at least one of Y₂O₃ and Dy₂O₃ and (2) a mixture of AlN and Al₂O₃, wherein the weight ratio of (1) at least one of Y₂O₃ and Dy₂O₃ to (2) the AlN and Al₂O₃ mixture, said mixture comprising from 5 to 65% by weight AlN is from 3:1 to 1:3; and a coating layer of Al₂O₃ provided on the surface of the substrate; and A still further embodiment according to this invention includes a cutting tool which comprises a substrate comprising from 50 to 80% by weight Si₃N₄, from 10 to 40% by weight TiN, and from 10 to 40% by weight a composite oxide sintering aid comprising (1) at least one of Y₂O₃ and Dy₂O₃ and (2) a mixture of AlN and Al₂O₃, wherein the weight ratio of (1) at least one of Y₂O₃ and Dy₂O₃ to (2) the AlN and Al₂O₃ mixture, said mixture comprising from 5 to 65% by weight of AlN is from 3:1 to 1:3, an inner coating layer of at least one of AlN and AlON or of at least of TiC and TiN, provided on the substrate; and an outer coating layer of Al₂O₃ provided on the inner coating layer.

The reasons for such constituents and layers as described above are discussed in more detail below.

Si₃N₄ and TiN are main components of the cutting tool or substrate of cutting tool of this invention. In particular, Si₃N₄ is essential because of its excellent characteristics which has been described above. α-Si₃N₄ is suitable to use as a starting material, and it is desirable for the grain size thereof to be 2 μm or less. TiN forms a dense disperse phase even at elevated temperatures and thus increases the toughness of the sintered body. Moreover, it has the effect of preventing crater wear when used in cutting tools. This effect, however, can be best obtained when the amount of TiN added is at least 5% by weight. If the amount of TiN added is more than 45% by weight, the resulting sintered body is inferior in thermal shock resistance and is easily deteriorated. Hence, the TiN content is within the range of from 5 to 45% by weight.

The composite oxide sintered aid as used herein serves to improve the sintering properties of the abovedescribed main components and enables production of the desired cutting tool and substrate by a cold press method that permits mass-production. If the amount of the composite oxide added is less than 5% by weight, these effects can be obtained only insufficiently. If the amount exceeds 45% by weight, the resulting cutting tool or substrate softens at elevated temperatures and is not as durable for cutting. Hence the composite oxide sintering aid content is within the range of from 5 to 45% by weight.

The weight ratio of at least one member of Y₂O₃ and Dy₂O₃ to Al₂O₃ is within the range of from 3:1 to 1:3; this being because the sintering properties are improved and the mechanical strength of the sintered body can be increased to the highest levels within this rage.

The weight ratio of at least one of Y₂O₃ and Dy₂O₃ to an AlN and Al₂O₃ mixture containing from 5 to 65% by weight AlN is also within the range of from 3:1 to 1:3, again because the sintering properties are improved and the mechanical strength of the sintered body can be increased to the highest levels within this range.

The AlN content of the AlN and Al₂O₃ mixture should be from 5 to 65% by weight in order that the hardness is increased without lowering the strength. If the AlN content of the mixture is less than 5% by weight, the effect can be obtained only insufficiently, whereas if it is more than 65% by weight, the strength is lowered.

A method of producing the cutting tool or substrate of the invention will hereinafter be explained.

The cutting tool or substrate for cutting tool is produced by cold-pressing a mixed powder of the abovedescribed components under an elevated pressure of at least 1 ton/cm², and firing the thus-formed mold in an atmosphere of nitrogen at a temperature of from 1,550° to 1,750° C. for a retention time of from 10 to 120 minutes. If the temperature does not reach 1,550° C., sintering cannot be attained, whereas if it exceeds 1,750° C., the Si₃N₄ component evaporates vigorously, causing a considerable degradation of surface roughness.

The thus-produced cutting tool is then polished in predetermined form, and thereafter, a desired coating layer can be provided on the surface thereof if desired. This coating layer can be provided by physical vacuum deposition methods, such as ion plating and reactive sputtering, and a chemical vapor deposition method (hereinafter referred to as a "CVD method"). Of these methods, the CVD method is preferred in that the component of the coating layer can be chosen within a wide range, and the reaction rate is high.

In accordance with the CVD method, an Al₂O₃ coating layer is provided as follows:

A cutting tool substrate which has been polished is placed in a reactor and heated to a temperature from 1,000° to 1,100° C. and, thereafter, AlCl₃, CO₂ and H₂ gases are introduced into the reactor to cause a deposition reaction represented by the equation (1) below to occur on the surface of the substrate.

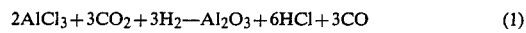

$$2AlCl_3 + 3CO_2 + 3H_2 \rightarrow Al_2O_3 + 6HCl + 3CO \quad (1)$$

In the formation of AlN, AlON, TiC and TiN coating layers, mixed gases at the left-side of the equations (2), (3), (4) and (5), respectively, as shown below are introduced into a reactor and reacted in the same manner as for the deposition reaction of the equation (1).

$$2AlCl_3 + N_2 + 3H_2 \rightarrow 2AlN + 6HCl \quad (2)$$

$$2AlCl_3 + 2CO_2 + 3H_2 + N_2 \rightarrow 2AlON + 6HCl + 2CO \quad (3)$$

$$TiCl_4 + CH_4 \rightarrow TiC + 4HCl \quad (4)$$

$$2TiCl_4 + N_2 + 4H_2 \rightarrow 2TiN + 8HCl \quad (5)$$

The coating layer may be a one layer structure, or a multi-layer structure. In the case of the multi-layer structure, an inner coating layer is first provided which is formed by any one or more of the deposition reactions represented by the above-described equations (2) to (5), and thereafter, an Al₂O₃ outer coating layer is provided utilizing the deposition reaction represented by the equation (1).

If the thickness of the coating layer is less than 0.3 μm, the effect of improving wear resistance is reduced. As the thickness is increased, the effect is increased. If, however, the thickness exceeds 5 μm, the resulting cutting tool is not suitable for practical use since the coating layer too easily peels apart from the substrate at the time of cutting. It is to be noted, however, that the coating layer or layers provided according to the invention are very difficult to peel part as compared with conventional coating layers. The reason for this is believed to be that the coefficient of thermal expansion of TiN, $8.5 \times 10^{-6}/°C.$, is nearly equal to that of $Al_2O_3$, $7.8 \times 10^{-6}/°C.$, which is the principal component of the coating layer, therefore the incorporation of TiN into the substrate eliminates the large difference in coefficient of thermal expansion between the substrate and the coating layer, increasing the adhesion between the substrate and the coating layer.

Although the ceramic tool of the invention can be produced by the hot press method and HIP method, it is difficult to mass-produce by the methods.

The present invention is described in detail by reference to the following examples.

EXAMPLE 1

$Si_3N_4$ (mean grain size: 0.7 μm; α-$Si_3N_4$ content: 90%), TiN (mean grain size: 2 μm), $Al_2O_3$ (mean grain size: 0.7 μm), $Y_2O_3$ (mean grain size: 1.2 μm) and AlN (mean grain size: 1.2 μm) were mixed in the proportions shown in Table 1 and ground in a ball mill. The weight ratio of $Al_2O_3$ to AlN was set at 1:1. Then, 5% by weight of paraffin was added thereto, and the resulting mixture was press-molded under a pressure of 1.5 ton/cm². The mold thus obtained, after the removal of the binder in a vacuum at 800° C., was sintered in an atmosphere of nitrogen at 1,650° C. for 1 hour. The thus-obtained sintered body was polished to produce a cutting test sample of SNG 432 (Chamfer 0.1 mm) and a sample for measuring a bending strength (4×8×25 mm). SNG 432 is prescribed in ANSI (American National Standards Institute).

The cutting performance was evaluated under the conditions as shown below. In Table 1, flank wear breadth $V_B$(mm) after 30-minute cutting was measured, and in Test 2, crater wear depth $K_T$(mm) after 5-minute cutting was measured. The results are shown in Table 2.

|  | Cutting Test Conditions | |
|---|---|---|
|  | Test 1 | Test 2 |
| Cutting Material | Gray Cast Iron | AISI 4140 Alloy Steel |
| Cutting Rate | 400 m/min. | 200 m/min. |
| Feed | 0.2 mm/rev. | 0.3 mm/rev. |
| Depth of Cutting | 2 mm | 1 mm |
| Cutting Time | 30 minutes | 5 minutes |

As can be seen from Table 2, if TiN is not added (Sample No. 1-13), $K_T$ becomes too large in 1 to 2 minutes and breakage occurs, and if TiN is added in an excess amount (Sample No. 1-12), $V_B$ is large and chipping occurs in Test 2. If the sintering aid content is too large (Sample No. 1-6), $V_B$ is large. Moreover, if the weight ratio of $Y_2O_3$ to $Al_2O_3$ and AlN mixture is too large (Sample No. 1-9), $V_B$ is large, and if it is too small (Sample No. 1-10), chipping occurs in Test 2.

It has thus been found that a sintered body produced using a composition falling within triangle ABC as illustrated in FIG. 1 shows superior cutting performance compared with the one with compositions falling outside of the triangle ABC.

TABLE 1

| Sample No. | $Si_3N_4$ (%) | TiN (%) | Sintering Aid (%) | Weight Ratio of ($Y_2O_3$/ $Al_2O_3$ + AlN Mixture) | Relative Density (%) |
|---|---|---|---|---|---|
| 1-1 | 76.5 | 9 | 14.5 | 2/1 | 98 |
| 1-2 | 60 | 10 | 30 | " | 99 |
| 1-3 | 60 | 25 | 15 | " | 99 |
| 1-4 | 65 | 15 | 20 | " | 99 |
| 1-5 | 77 | 3 | 20 | " | 98 |
| 1-6 | 53 | 15 | 32 | " | 96 |
| 1-7 | 65 | 15 | 20 | 1/1 | 99 |
| 1-8 | 65 | 15 | 20 | 1/2 | 98 |
| 1-9 | 65 | 15 | 20 | 4/1 | 97 |
| 1-10 | 65 | 15 | 20 | 1/4 | 96 |
| 1-11 | 65 | 15 | 20 | 1/1 | 98 |
| 1-12 | 40 | 40 | 20 | 1/1 | 96 |
| 1-13 | 80 | 0 | 20 | 2/1 | 98 |

TABLE 2

| Sample No. | Strength (kg/mm²) | Hardness (45 N) | Test 1 $V_B$ (mm) | Test 2 $K_T$ (μm) | Remarks |
|---|---|---|---|---|---|
| 1-1 | 88 | 88 | 0.12 | 19 | Examples of the invention |
| 1-2 | 84 | 88 | 0.12 | 19 | Examples of the invention |
| 1-3 | 83 | 89 | 0.09 | 10 | Examples of the invention |
| 1-4 | 88 | 89 | 0.10 | 11 | Examples of the invention |
| 1-5 | 82 | 87 | 0.21 | 65 | Comparative examples |
| 1-6 | 60 | 85 | 0.29 | 39 | Comparative examples |
| 1-7 | 90 | 88.5 | 0.10 | 18 | Examples of the invention |
| 1-8 | 86 | 89.5 | 0.12 | 19 | Examples of the invention |
| 1-9 | 70 | 85.5 | 0.25 | 45 | Comparative examples |
| 1-10 | 65 | 86.5 | 0.20 | 35 (chipping) | Comparative examples |
| 1-11 | 84 | 88 | 0.10 | 20 | Examples of the invention |
| 1-12 | 58 | 85 | 0.30 | 25 (chipping) | Comparative examples |
| 1-13 | 85 | 87.5 | 0.19 | (broken from crater) | Comparative examples |

EXAMPLE 2

Sintered bodies were produced in the same manner as in Example 1 using the compositions shown in Table 3.

These sintered bodies were subjected to Test 1 of Example 1, and further to Test 3 under the conditions as shown below. RNG 432 is prescribed in ANSI. The results are shown in Table 3.

Figure 2:
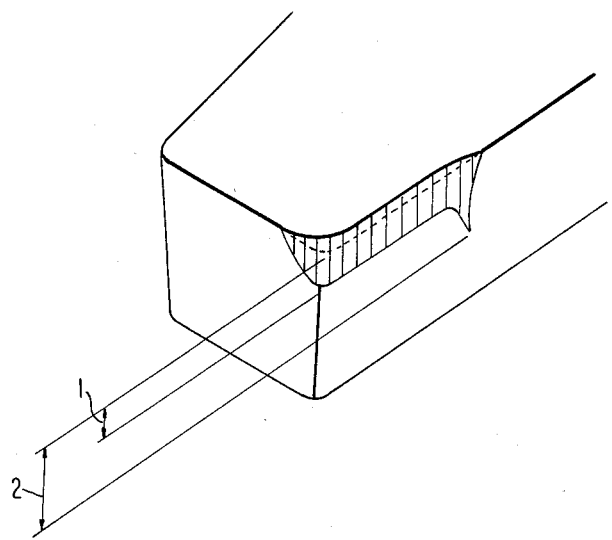
FIG. 2 is a perspective view of a cutting tool, showing flank wear $V_B$ and notch wear $V_B'$ in the case of Cutting Test 3 as described hereafter, in which the numerals 1 and 2 indicate $V_B$ and $V_B'$, respectively.

Test 3:
Form of Test Tool: RNG 432
Cutting Material: Inconel 718 (heat-resistant Ni alloy)
Cutting Rate: 250 m/min.
Feed: 0.2 mm/revolution
Depth of Cutting: 0.5 mm
Cutting Time: 2 minutes
Evaluation: Notch wear $V_B'$
$V_B'$ is illustrated in detail in FIG. 2.

TABLE 3

| | Sample No. | | | | |
|---|---|---|---|---|---|
| | 2-1 | 2-2 | 2-3 | 2-4 | 2-5 |
| Composition (%) | | | | | |
| $Si_3N_4$ | 60 | 60 | 60 | 60 | 60 |
| TiN | 10 | 10 | 10 | 10 | 10 |
| Sintering Aid | 30 | 30 | 30 | 30 | 30 |
| Composition of Sintering Aid (%) | | | | | |
| $Y_2O_3$ | 20 | 19 | 20 | 20 | 20 |
| $DY_2O_3$ | 0 | 1 | 0 | 0 | 0 |
| $Al_2O_3$ | 9 | 6 | 4 | 10 | 3 |
| AlN | 1 | 4 | 6 | 0 | 7 |
| Relative Density (%) | 99 | 99 | 99 | 99 | 99 |
| Rate (kg/cm²) | 83 | 84 | 83 | 80 | 65 |
| Test 1 $V_B$ (mm) | 0.13 | 0.12 | 0.09 | 0.16 | 0.25 (chipping) |
| Test 3 $V_B'$ (mm) | 0.30 | 0.20 | 0.10 | 0.90 | (broken in 10 seconds) |

Note:
Sample Nos. 2-1, 2-2 and 2-3: Examples of the invention
Sample Nos. 2-4 and 2-5: Comparative examples As can be seen from Table 3, the wear in cutting of cast iron is improved by adding AlN; this improvement is marked particularly in cutting of Inconel 718.

EXAMPLE 3

$Si_3N_4$ powder (α-$Si_3N_4$ content: 90% by weight; mean grain size: 0.7 μm), TiN (mean grain size: 2 μm), $Al_2O_3$ (mean grain size: 0.7 μm), $Y_2O_3$ (mean grain size: 1,2 μm), and $Dy_2O_3$ (mean grain size: 1.0 μm) were compounded in the proportions as shown in Table 4, ground in a wet ball mill, and then dried. To 100 parts by weight of each mixed powder as prepared above was added 5 parts by weight of paraffin as a binder. The resulting mixture was kneaded and granulated, and cold-pressed at an elevated pressure of 1,500 kg/cm².

The thus-obtained mold was fired in a vacuum at a temperature of 800° C. for a retention time of 30 minutes to remove the binder and, thereafter, it was further sintered in an atmosphere of nitrogen at a temperature of 1,650° C. for a retention time of 60 minutes to produce a sintered body. The sintered body was polished to prepare a bending test sample (measuring 4×8×25 mm in size).

In this way, Sample Nos. 3-1 to 3-9 were produced. Samples Nos. 3-1 to 3-5 each had the composition falling within the range as defined in the invention, whereas Sample Nos. 3-6 to 3-9 were comparative examples in which the composition was outside the range of the invention.

Also for comparison, a conventional sintered body comprising 70% by weight $Al_2O_3$, 25% by weight TiC, 4% by weight $Nb_2O_5$, and 0.1% by weight MgO was produced by a hot press method and polished in the same manner as above. This was designated as "Sample No. 3-10".

These samples were measured for relative specific gravity, bending strength, and hardness. The results are shown in Table 5. The hardness is a Rockwell superficial hardness value by 45N scale.

TABLE 4

| Sample No. | Composition (wt %) | | | | | Remarks |
|---|---|---|---|---|---|---|
| | $Si_3N_4$ | TiN | $Y_2O_3$ | $Dy_2O_3$ | $Al_2O_3$ | |
| 3-1 | 65 | 20 | 7.5 | — | 7.5 | Examples falling within the range of the invention |
| 3-2 | 52 | 40 | 5.3 | — | 2.7 | Examples falling within the range of the invention |
| 3-3 | 80 | 12 | 5.3 | — | 2.7 | Examples falling within the range of the invention |
| 3-4 | 52 | 13 | 11.7 | — | 23.3 | Examples falling within the range of the invention |
| 3-5 | 65 | 20 | — | 7.5 | 7.5 | Examples falling within the range of the invention |
| 3-6 | 48 | 10 | 21 | — | 21 | Examples falling outside the range of the invention |
| 3-7 | 50 | 47 | 2 | — | 1 | Examples falling outside the range of the invention |
| 3-8 | 65 | 20 | 12 | — | 3 | Examples falling outside the range of the invention |
| 3-9 | 65 | 20 | 3 | — | 12 | Examples falling outside the range of the invention |
| 3-10*1 | Refer to Note below. | | | | | Comparative Example |

Note:
*1Consisting of 70% $Al_2O_3$, 25% TiC, 1% $Nb_2O_5$ and 1% MgO.

TABLE 5

| Sample No. | Relative Specific Gravity | Bending Strength (kg/mm²) | Hardness | Remarks |
|---|---|---|---|---|
| 3-1 | 99 | 91 | 88 | Examples falling within the range of the invention |
| 3-2 | 97 | 83 | 87 | Examples falling within the range of the invention |
| 3-3 | 97 | 86 | 87 | Examples falling within the range of the invention |
| 3-4 | 99 | 79 | 88 | Examples falling within the range of the invention |
| 3-5 | 98 | 88 | 87 | Examples falling within the range of the invention |
| 3-6 | 95 | 55 | 83 | Example falling outside the range of the invention |
| 3-7 | 93 | 47 | 82 | Example falling outside the range of the invention |
| 3-8 | 96 | 65 | 83 | Example falling outside the range of the invention |
| 3-9 | 95 | 51 | 85 | Example falling outside the range of the invention |
| 3-10 | 100 | 85 | 91 | Comparative Example |

As can be seen from Table 5, the sintered bodies (Sample Nos. 3-1 to 3-5) with the composition falling within the range of the invention have excellent characteristics comparable to those of the conventional sintered body (Sample No. 3-10). On the other hand, the sintered bodies (Sample Nos. 3-6 to 3-9) with compositions falling outside the range of the invention are seriously inferior in bending strength and slightly inferior even in specific gravity and hardness. This demonstrates that a sintered body to be used as a cutting tool or substrate for the cutting tool of the invention, having very desirable mechanical strength, sintering properties, and hardness as compared with conventional sintered bodies which are produced by a hot press method, can be produced by a cold press method as long as it has a composition falling within the range as described herein.

Sintered bodies were produced in the same manner as above and polished in the form of SNG 432 (Chamfer 0.1 mm × −25°). With each sintered body using as a substrate for the cutting tool, a coating layer as shown in Table 6 was provided on the surface thereof by the use of a CVD apparatus. In this way, Cutting Tool Nos. 3-1 to 3-9, 3-1a, 3-1b, 3-1c, 3-1d, and 3-1e were produced.

Although the CVD apparatus is well known, since the rate of reaction and the thickness of the coating layer vary with conditions under which the apparatus is used, the conditions are described in detail below.

$H_2$ and $N_2$ gases were introduced in amounts of, respectively, four times and seven times the theoretical ones, and the other gases were introduced in almost the theoretical amounts. The presence in the reactor was maintained at 500 Torr in the case of deposition of TiN, and at 30 to 50 Torr in the case of deposition of other layers. Since the thickness of the coating layer varies also with the time for which the mixed gas is passed, preliminary experiments were made to confirm that $Al_2O_3$, AlN and AlON were each deposited in a thickness of 0.5 μm per unit time, whereas TiC and TiN were each deposited in a thickness of 1 μm per unit time. Based on these preliminary experiments, the time was determined so that the coating layer could be formed in the desired thickness.

These cutting tools were subjected to Test I and Test II as described below under the conditions shown in Table 7.

Test I:

A flank wear breadth $V_B$ (mm) after 30-minute cutting was measured.

Test II:

The number of shocks applied till the tool was broken was measured (this number is hereinafter referred to "N").

The results are shown in Table 8.

For comparison, Cutting Tool Nos. 3-1f, 3-5a and 3-10, with no coating layer provided thereto were tested under the conditions shown in Table 7. The results are shown in Table 8.

Wear resistance was evaluated on the basis of $V_B$, and thermal shock resistance and mechanical shock resistance were evaluated on the basis of N.

TABLE 7

|  | Test I | Test II |
| --- | --- | --- |
| Cutting Method | Lathe cutting | Milling |
| Material to be cut | Gray Cast Iron | AISI 1045 Steel |
| Cutting Rate | 400 m/min. | 150 m/min. |
| Feed | 0.2 mm/rev. | 0.5 mm/tooth |
| Depth of Cut | 2 mm | 2 mm |

TABLE 8

| Cutting Tool No. | Test I $V_B$ (mm) | Test II N (Number) | Remarks |
| --- | --- | --- | --- |
| 3-1 | 0.15 | 3,500 | Examples falling within the range of the invention |
| 3-1a | 0.08 | >5,000 | Examples falling within the range of the invention |
| 3-1b | 0.10 | 4,250 | Examples falling within the range of the invention |
| 3-1c | 0.09 | >5,000 | Examples falling within the range of the invention |
| 3-2 | 0.10 | " | Examples falling |

TABLE 6

| Type of Sintered Body (Sample No.) | Type of Tool (Cutting Tool No.) | Inner Layer | Outer Layer | Thickness (μm) | Remarks |
| --- | --- | --- | --- | --- | --- |
| 3-1 | 3-1 | — | $Al_2O_3$ | 2 | Examples falling within the range of the invention |
| 3-1 | 3-1a | AlON | " | 1 | Examples falling within the range of the invention |
| 3-1 | 3-1b | TiN | " | 2 | Examples falling within the range of the invention |
| 3-1 | 3-1c | TiC | " | 2 | Examples falling within the range of the invention |
| 3-2 | 3-2 | AlON | " | 1 | Examples falling within the range of the invention |
| 3-3 | 3-3 | " | " | 1 | Examples falling within the range of the invention |
| 3-4 | 3-4 | " | " | 1 | Examples falling within the range of the invention |
| 3-5 | 3-5 | " | " | 1 | Examples falling withing the range of the invention |
| 3-6 | 3-6 | AlON | $Al_2O_3$ | 1 | Example falling outside of the range of the invention |
| 3-7 | 3-7 | " | " | 1 | Example falling outside of the range of the invention |
| 3-8 | 3-8 | " | " | 1 | Example falling outside of the range of the invention |
| 3-9 | 3-9 | " | " | 1 | Example falling outside of the range of the invention |
| 3-1 | 3-1d | AlON | $Al_2O_3$ | 0.2 | Comparative Example |
| 3-1 | 3-1e | " | " | 7 | " |
| 3-1 | 3-1f | *1 Refer to Note below. | | | " |
| 3-5 | 3-5a | *1 | | | " |
| 3-10 | 3-10 | *1 | | | " |

Note:
*1: Cutting Tool Nos. 3-f, 3-5a and 3-10 are comparative examples in which no coating layer was provided on the surface of the substrate.

TABLE 8-continued

| Cutting Tool No. | Test I $V_B$ (mm) | Test II N (Number) | Remarks |
| --- | --- | --- | --- |
| 3-3 | 0.10 | " | within the range of the invention Examples falling within the range of the invention |
| 3-4 | 0.09 | " | Examples falling within the range of the invention |
| 3-5 | 0.11 | " | Examples falling within the range of the invention |
| 3-6 | 0.26 | 310 | Examples falling outside the range of the invention |
| 3-7 | 0.28 | 150 | Examples falling outside the range of the invention |
| 3-8 | 0.20 | 2,340 | Examples falling outside the range of the invention |
| 3-9 | 0.18 | 630 | Examples falling outside the range of the invention |
| 3-1d*[1] | 0.35 | 2,500 | Comparative Examples |
| 3-1e*[2] | — | — | Comparative Examples |
| 3-1f*[1] | 0.45 | 1,500 | Comparative Examples |
| 3-5a*[1] | 0.53 | 1,500 | Comparative Examples |
| 3-10 | 0.10 | 130 | Comparative Examples |

Note:
*[1]Cutting Tool Nos. 3-1d, 3-1f and 3-5a were seriously worn out during the milling. Thus, before the tool was broken, the cutting operation was stopped, and the number of shock applied till then was measured.
*[2]In the case of Cutting Tool No. 3-1e, peeling occurred in one minute during the lathe cutting and in one path during the milling.

As can be seen from Table 8, the tools of the invention (Cutting Tool Nos. 3-1 to 3-5, 3-1a, 3-1b and 3-1c) in which the composition of the substrate falls within the range of the invention are greatly superior in wear resistance, thermal shock resistance, and mechanical shock resistance as compared with the tools (Cutting Tool Nos. 3-6 to 3-9) with the substrate compositions falling outside the range of the invention. This demonstrates that when the same coating layer is provided, the excellent characteristics of each component constituting the substrate are exhibited by using it within the range of the invention.

In addition, the tools of the invention (Cutting Tool Nos. 3-1 to 3-5, 3-1a, 3-1b and 3-1c) have superior characteristics compared with the comparative examples (Cutting Tool Nos. 3-1d, 3-1e, 3-1f, 3-5a and 3-10). This demonstrates that even if the substrate per se is equal in some characteristics to the substrate with the composition falling within the range of the invention, if a coating layer in accordance with the present invention is not provided, the cutting tool obtained therefrom has performance only equal or inferior to that of conventional tools, whereas the substrate with the composition falling within the range of the invention is improved in wear resistance, thermal shock resistance, and mechanical shock resistance by providing coating layers in accordance with the present invention.

EXAMPLE 4

$Si_3N_4$ powder ($\alpha$-$Si_3N_4$ content: 90% by weight; mean grain size: 0.7 $\mu$m), TiN (mean grain size: 2 $\mu$m), $Al_2O_3$ (mean grain size: 0.7 $\mu$m), $Y_2O_3$ (mean grain size: 1.2 $\mu$m), $Dy_2O_3$ (mean grain size: 1.0 $\mu$m), and AlN (mean grain size: 1.2 $\mu$m) were compounded in the proportions as shown in Table 9, ground in a wet ball mill, and then dried. To 100 parts by weight of each mixed powder as prepared above was added 5 parts by weight of paraffin. The resulting mixture was kneaded and granulated, and cold-pressed at an elevated pressure of 1,500 kg/cm$^2$.

The thus-obtained mold was fired in a vacuum at a temperature of 800° C. for a retention time of 30 minutes to remove the binder, and thereafter it was further sintered in an atmosphere of nitrogen at a temperature of 1,650° C. for a retention time of 60 minutes to produce a sintered body. The sintered body was polished to prepare a bending test sample (measuring 4$\times$8$\times$25 mm in size).

In this way, Sample Nos. 4-1 to 4-9 were produced. Sample Nos. 4-1 to 4-5 each had the composition falling within the range of the invention, whereas Sample Nos. 4-6 to 4-9 were comparative examples in which the composition was outside the range of the invention.

Also for comparison, a conventional sintered body comprising 70% by weight $Al_2O_3$, 25% by weight TiC, 4% by weight $Nb_2O_5$, and 1% by weight MgO was produced by a hot press method and polished in the same manner as above. This is designated as "Sample No. 4-10".

These sintered body samples were measured for relative specific gravity, bending strength, and hardness. The results are shown in Table 10. The hardness is a Rockwell superficial hardness value by 45N scale.

TABLE 9

| Type of Sintered Body (Sample No.) | Composition (Wt %) | | | | | | Remarks |
| --- | --- | --- | --- | --- | --- | --- | --- |
| | $Si_3N_4$ | TiN | $Y_2O_3$ | $Dy_2O_3$ | $Al_2O_3$ | AlN | |
| 4-1 | 65 | 20 | 7.5 | — | 3.5 | 4.0 | Examples falling within the range of the invention |
| 4-2 | 52 | 40 | 5.3 | — | 1.0 | 1.7 | Examples falling within the range of the invention |
| 4-3 | 80 | 12 | 5.3 | — | 1.0 | 1.7 | Examples falling within the range of the invention |
| 4-4 | 52 | 13 | 11.7 | — | 21.0 | 2.3 | Examples falling within the range of the invention |
| 4-5 | 65 | 20 | — | 7.5 | 3.0 | 4.5 | Examples falling within the range of the invention |
| 4-6 | 48 | 10 | 21 | — | 16 | 15 | Examples falling outside the range |

TABLE 9-continued

| Type of Sintered Body (Sample No.) | Composition (Wt %) | | | | | | Remarks |
|---|---|---|---|---|---|---|---|
| | $Si_3N_4$ | TiN | $Y_2O_3$ | $Dy_2O_3$ | $Al_2O_3$ | AlN | |
| 4-7 | 50 | 47 | 2 | — | 1 | 0 | Examples falling outside the range of the invention |
| 4-8 | 65 | 20 | 12 | — | 3 | 0 | Examples falling outside the range of the invention |
| 4-9 | 65 | 20 | 3 | — | 0 | 12 | Examples falling outside the range of the invention |
| 4-10*[1] | Refer to Note below | | | | | | Comparative Example |

Note:
*[1]Consisting of 70% $Al_2O_3$, 25% TiC, 4% $Nb_2O_5$, and 1% MgO.

TABLE 10

| Type of Sintered Body (Sample No.) | Relative Specific Gravity | Bending Strength (kg/mm²) | Hardness | Remarks |
|---|---|---|---|---|
| 4-1 | 99 | 92 | 89.0 | Examples falling within the range of the invention |
| 4-2 | 97 | 84 | 87.5 | Examples falling within the range of the invention |
| 4-3 | 97 | 85 | 88.0 | Examples falling within the range of the invention |
| 4-4 | 99 | 80 | 88.5 | Examples falling within the range of the invention |
| 4-5 | 98 | 89 | 88.0 | Examples falling within the range of the invention |
| 4-6 | 95 | 55 | 84.0 | Examples falling outside the range of the invention |
| 4-7 | 93 | 47 | 82 | Examples falling outside the range of the invention |
| 4-8 | 96 | 65 | 82 | Examples falling outside the range of the invention |
| 4-9 | 93 | 43 | 82 | Examples falling outside the range of the invention |
| 4-10 | 100 | 85 | 91 | Comparative example |

As can be seen from Table 10, the sintered bodies (Sample Nos. 4-1 to 4-5) with the composition falling within the range of the invention have excellent characteristics comparable to those of the conventional sintered body (Sample No. 4-10). On the other hand, the sintered bodies (Samples Nos. 4-6 to 4-9) with compositions falling outside the range of the invention are seriously inferior in bending strength and moreover slightly inferior in specific gravity and hardness. This demonstrates that a sintered body to be used as a cutting tool or substrate for the cutting tool of the invention, having very desirable mechanical strength, sintering properties, and hardness as compared with conventional sintered bodies which are produced by a hot press method, can be produced by a cold press method as long as it has a composition falling within the range of the invention as described herein.

Sintered bodies were produced in the same manner as above and polished in the form of SNG 432 (Chamfer 0.1 mm× −25°) and also in the form of RNG 432. With each sintered body as a substrate, a coating layer as shown in Table 11 was provided on the surface thereof by the use of a CVD apparatus. In this way, cutting tools (Cutting Tool Nos. 4-1 to 4-9, 4-1a, 4-1b, 4-1c, 4-1d and 4-1e) were produced.

The CVD were made in the same manner as generally indicated in Example 3, with the specific data for specific Samples being set forth in Table 11 below.

TABLE 11

| Type of Sintered Body (Sample No.) | Type of Tool (Cutting Tool No.) | Coating Layer | | | Remarks |
|---|---|---|---|---|---|
| | | Inner Layer | Outer Layer | Thickness (μm) | |
| 4-1 | 4-1 | — | $Al_2O_3$ | 2 | Examples falling within the range of the invention |
| 4-1 | 4-1a | AlON | " | 1 | Examples falling within the range of the invention |
| 4-1 | 4-1b | TiN | " | 2 | Examples falling within the range of the invention |
| 4-1 | 4-1c | TiC | " | 2 | Examples falling within the range of the invention |
| 4-2 | 4-2 | AlON | " | 1 | Examples falling within the range of the invention |
| 4-3 | 4-3 | " | " | 1 | Examples falling within the range of the invention |
| 4-4 | 4-4 | " | " | 1 | Examples falling within the range of the invention |
| 4-5 | 4-5 | " | " | 1 | Examples falling within the range of the invention |
| 4-6 | 4-6 | AlON | $Al_2O_3$ | 1 | Examples falling outside the range of the invention |
| 4-7 | 4-7 | " | " | 1 | Examples falling outside the range of the invention |
| 4-8 | 4-8 | " | " | 1 | Examples falling outside |

TABLE 11-continued

| Type of Sintered Body (Sample No.) | Type of Tool (Cutting Tool No.) | Coating Layer Inner Layer | Coating Layer Outer Layer | Thickness (μm) | Remarks |
|---|---|---|---|---|---|
| 4-9 | 4-9 | " | " | 1 | the range of the invention Examples falling outside the range of the invention |
| 4-1 | 4-1d | AlON | Al₂O₃ | 0.2 | Comparative examples |
| 4-1 | 4-1e | " | " | 7 | " |
| 4-1 | 4-1f*¹ | Refer to Note below. | | | " |
| 4-5 | 4-5a*¹ | | | | " |
| 4-10 | 4-10*¹ | | | | " |

Note:
*¹Cutting Tool Nos. 4-1f, 4-5a and 4-10 are comparative examples in which no coating layer was provided on the surface of the substrate.

These cutting tools were subjected to Test I and Test II in the same manner as in Example 3.

For comparison, Cutting Tool Nos. 4-1f, 4-5a and 4-10, with no coating layer provided thereon wher also tested in the same manner as in Example 3. The results are shown in Table 12.

TABLE 12

| Cutting Tool No. | Test I $V_B$ (mm) | Test II N (Number) | Remarks |
|---|---|---|---|
| 4-1 | 0.10 | 4,000 | Examples falling within the range of the invention |
| 4-1a | 0.08 | >5,000 | Examples falling within the range of the invention |
| 4-1b | 0.09 | 4,000 | Examples falling within the range of the invention |
| 4-1c | 0.09 | >5,000 | Examples falling within the range of the invention |
| 4-2 | 0.09 | " | Examples falling within the range of the invention |
| 4-3 | 0.09 | " | Examples falling within the range of the invention |
| 4-4 | 0.08 | " | Examples falling within the range of the invention |
| 4-5 | 0.09 | " | Examples falling within the range of the invention |
| 4-6 | 0.24 | 350 | Examples falling outside the range of the invention |
| 4-7 | 0.28 | 150 | Examples falling outside the range of the invention |
| 4-8 | 0.20 | 2,340 | Examples falling outside the range of the invention |
| 4-9 | 0.20 | 120 | Examples falling outside the range of the invention |
| 4-1d*¹ | 0.35 | 2,500 | Comparative examples |
| 4-1e*² | — | — | " |
| 4-1f*¹ | 0.45 | 1,500 | " |
| 4-5a*¹ | 0.53 | 1,500 | " |
| 4-10 | 0.10 | 130 | " |

Note:
*¹Cutting Tool Nos. 4-1d, 4-1f and 4-5a were seriously worn out during the milling. Thus, before the tool was broken, the cutting operation was stopped, and the number of shock applied till then was measured.
*²In the case of Cutting Tool No. 4-1e, peeling occurred in one minute during the lathe cutting and in one path during the milling.

As can be seen from Table 12, the tools of the invention (Cutting Tool Nos. 4-1 to 4-5, 4-1a, 4-1b and 4-1c) in which the composition of the invention are greatly superior in wear resistance, thermal shock resistance and mechanical shock resistance as compared with the tools (Cutting Tool Nos. 4-6 to 4-9) with the substrate compositions falling outside the range of the invention. This demonstrates that when the same coating layer is provided, the excellent characteristics of each component constituting the substrate are exhibited by using it within the range of the invention.

In addition, the tools of the invention (Cutting Tool Nos. 4-1 to 4-5, 4-1a, 4-1b and 4-1c) have superior characteristics compared with the comparative examples (Cutting Tool Nos. 4-1d, 4-1e, 4-1f, 4-5a and 4-10). This demonstrates that even if the substrate per se is equivalent in some characteristics to the substrate with the composition falling within the range of the invention, if a coating layer in accordance with the present invention is not provided, the cutting tool obtained therefrom has performance only equal or inferior to that of the conventional tools, whereas the substrate with the composition falling within the range of the invention is improved in wear resistance, thermal shock resistance, and mechanical shock resistance by providing coating layers in accordance with the present invention.

The cutting tool of the invention, as described above, has very desirable mechanical strength and hardness as compared with conventional cutting tools, and is superior in wear resistance, thermal shock resistance, and mechanical shock resistance to conventional cutting tools. Hence the cutting tool of the invention is suitable for use in high-speed continuous cutting, and moreover is suitable for mass-production since it can be produced by a cold press method.

The nitride based sintered body of the invention is useful not only for cutting tool, but also for heat-resistant and wear-resistant mechanical parts which are subjected to vibration and heat, such as a drawing die and an impact die.

While the invention has been described in detail and with reference to specific embodiments thereof, it will be apparent to one skilled in the art that various changes and modifications can be made therein without departing from the spirit and scope thereof.

What is claimed is:

1. A nitride based ceramic cutting tool comprising from 50 to 90% by weight $Si_3N_4$, from 5 to 45% by weight TiN and from 5 to 45% by weight a composite oxide sintering aid, said sintering aid comprising (1) at least one of $Y_2O_3$ and $Dy_2O_3$ and (2) $Al_2O_3$ alone or a mixture of AlN and $Al_2O_3$, said mixture comprising from 5 to 65% by weight AlN, and the weight ratio of (1) at least one of $Y_2O_3$ and $Dy_2O_3$ to (2) $Al_2O_3$ alone or the AlN and $Al_2O_3$ mixture being 3:1 to 1:3,
wherein the $Si_3N_4$, TiN and sintering aid comprise from 50 to 80%, from 10 to 45% and from 5 to 40% by weight, respectively said sintering aid comprising (1) at least one of $Y_2O_3$, and $Dy_2O_3$ and (2) $Al_2O_3$, the weight ratio of (1) at least one of $Y_2O_3$ and $Dy_2O_3$ to (2) $Al_2O_3$ being 3:1 to 1:3, further comprising a surface coating layer of $Al_2O_3$ formed thereon.

2. A nitride based ceramic cutting tool as in claim 1, wherein the $Si_3N_4$, TiN, and said sintering aid comprise from 50 to 80%, from 10 to 40% and from 10 to 40% by weight, respectively, said sintering aid comprising (1) at least one of $Y_2O_3$ and $Dy_2O_3$ and (2) $Al_2O_3$, the weight ratio of (1) at least one of $Y_2O_3$ and $Dy_2O_3$ to (2) $Al_2O_3$ being 3:1 to 1:3, further comprising an inner surface coating layer of at least one of AlN and AlON or of at least one of TiC and TiN formed thereon and an outer surface coating layer of $Al_2O_3$ formed on said inner surface coating layer.

3. A nitride based ceramic cutting tool as in claim 1, wherein the $Si_3N_4$, TiN and sintering aid comprise from 50 to 85%, from 10 to 45% and from 5 to 40% by weight, respectively, said sintering aid comprising (1) at least one of $Y_2O_3$ and $Dy_2O_3$ and (2) a mixture of AlN and $Al_2O_3$, said mixture comprising from 5 to 65% by weight AlN, the weight ratio of (1) at least one of $Y_2O_3$ and $Dy_2O_3$ to (2) said AlN mixture being 3:1 to 1:3, further comprising a surface coating layer of $Al_2O_3$ formed thereof.

4. A nitride based ceramic cutting tool as in claim 1, wherein the $Si_3N_4$, TiN and sintering aid comprise from 50 to 80%, from 10 to 40% and 10 to 40% by weight, respectively, said sintering aid comprising (1) at least one of $Y_2O_3$ and $Dy_2O_3$ and (2) a mixture of AlN and $Al_2O_3$, said mixture comprising from 5 to 65% by weight AlN, the weight ratio of (1) at least one of $Y_2O_3$ and $Dy_2O_3$ to (2) said mixture being 3:1 to 1:3, further comprising an inner surface coating layer of at least one of AlN and AlON or of at least one of TiN and TiC formed thereon and an outer surface coating layer of $Al_2O_3$ formed on said inner surface coating layer.

* * * * *